United States Patent
Michael et al.

(10) Patent No.: US 10,103,519 B2
(45) Date of Patent: Oct. 16, 2018

(54) KRYPTON-85-FREE SPARK GAP WITH PHOTO-EMISSION

(71) Applicant: General Electric Company, Schenectady, NY (US)

(72) Inventors: Joseph Darryl Michael, Delmar, NY (US); Jason Frederick Trotter, Glenville, NY (US); Mohamed Rahmane, Ballston Lake, NY (US); Timothy John Sommerer, Ballston Spa, NY (US); Karim Younsi, Ballston Spa, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/239,561

(22) Filed: Aug. 17, 2016

(65) Prior Publication Data
US 2018/0054045 A1 Feb. 22, 2018

(51) Int. Cl.
*H01T 15/00* (2006.01)
*H01T 1/00* (2006.01)
*F02C 7/266* (2006.01)

(52) U.S. Cl.
CPC .............. *H01T 15/00* (2013.01); *F02C 7/266* (2013.01); *H01T 1/00* (2013.01); *F05D 2220/323* (2013.01)

(58) Field of Classification Search
CPC ... H01T 15/00; H01T 1/00; H05H 1/24; H01J 37/32055; F02C 7/26; F02C 7/264; F02C 7/266; F02C 7/27
USPC .................................................... 315/111.21
See application file for complete search history.

(56) References Cited

U.S. PATENT DOCUMENTS

| | | | | |
|---|---|---|---|---|
| 3,811,070 A | * | 5/1974 | Voshall | H01J 17/14 313/552 |
| 4,046,123 A | | 9/1977 | Jordan et al. | |
| 4,396,855 A | * | 8/1983 | Imai | F02P 9/007 313/139 |
| 4,402,036 A | * | 8/1983 | Hensley | F02P 7/03 313/138 |
| 4,771,168 A | * | 9/1988 | Gundersen | H01T 2/00 250/214.1 |
| 4,841,925 A | * | 6/1989 | Ward | F02P 3/0884 123/143 B |
| 4,890,040 A | | 12/1989 | Gundersen | |

(Continued)

FOREIGN PATENT DOCUMENTS

| | | |
|---|---|---|
| FR | 2 470 462 A2 | 5/1981 |
| FR | 2 984 028 A1 | 6/2013 |
| WO | 9850990 A1 | 11/1998 |

OTHER PUBLICATIONS

Chung, Max; "UV LED Triggered Spark Gap", Plasma Science, 2007. ICOPS 2007. IEEE 34th International Conference on, pp. 344, Jun. 17-22, 2007, Albuquerque, NM.

(Continued)

*Primary Examiner* — Jason M Crawford
(74) *Attorney, Agent, or Firm* — GE Global Patent Operation; Nitin Joshi (57) ABSTRACT

An approach is disclosed for generating seed electrons at a spark gap in the absence of $^{85}$Kr. The present approach utilizes the photo-electric effect, using a light source with a specific nominal wave length (or range of wavelengths) at a specific level of emitted flux to generate seed electrons.

18 Claims, 12 Drawing Sheets

(56) References Cited

U.S. PATENT DOCUMENTS

| | | | | |
|---|---|---|---|---|
| 5,057,740 | A | 10/1991 | Kirkman-Amemiya | |
| 5,508,625 | A * | 4/1996 | Adams | H01L 31/08 |
| | | | | 250/214.1 |
| 7,336,472 | B2 | 2/2008 | Nerheim et al. | |
| 7,579,770 | B2 | 8/2009 | Yang et al. | |
| 9,341,610 | B1 * | 5/2016 | McIver | G01N 33/22 |
| 2002/0193033 | A1 * | 12/2002 | Nasu | H01T 13/20 |
| | | | | 445/7 |
| 2003/0121887 | A1 * | 7/2003 | Garvey | B82Y 30/00 |
| | | | | 216/65 |
| 2006/0152128 | A1 * | 7/2006 | Manning | H01J 61/025 |
| | | | | 313/113 |
| 2007/0165351 | A1 | 7/2007 | Menke | |
| 2007/0209634 | A1 * | 9/2007 | Minami | F02P 5/00 |
| | | | | 123/310 |
| 2013/0025255 | A1 * | 1/2013 | Zizzo | H01J 17/30 |
| | | | | 60/39.821 |
| 2018/0054881 | A1 * | 2/2018 | Michael | H05H 1/52 |

OTHER PUBLICATIONS

Sozer, Esin B., et al.; "Investigation of UV LEDs for compact back-lighted thyratron triggering", 2009 IEEE Pulsed Power Conference, pp. 610-612, Jun. 28, 2009-Jul. 2, 2009, Washington, DC.
International Search Report and Written Opinion issued in connection with corresponding PCT Application No. PCT/US2017/041104 dated Oct. 13, 2017.

\* cited by examiner

KRYPTON-85-FREE SPARK GAP WITH PHOTO-EMISSION

BACKGROUND

The subject matter disclosed herein relates to spark gaps for use in ignition systems or other suitable systems.

Spark gaps are passive, two-terminal switches that are open when the voltage across the terminals is low, and then close when the voltage across the terminals exceeds a design value (e.g., 3 kV). The spark gap then re-opens when the current has fallen to a low level or when most of the energy from the voltage source is dissipated. Internally the current is carried between two metal electrodes that are separated by a small 'gap' (~mm) that is filled with a gas or gas mixture (e.g., Ar—$H_2$—Kr) near atmospheric pressure. The gas is ordinarily insulating, but it becomes a conducting plasma 'spark' when the voltage between the two electrodes exceeds the design value which corresponds to the breakdown voltage.

For various applications, one parameter of interest may be the time between when a sufficient voltage is applied to the spark gap and the time at which it becomes conducting. This time corresponds to the 'breakdown' processes that initiate the transition of the gas from an insulator to a conductor.

There is an idealized but useful view of electrical breakdown as a two-step process—a 'statistical' time for the first electron to appear, followed by 'formative' time for the electrons to 'avalanche' to a highly conductive state. A free electron appears at some time and location in the gap, and is accelerated by the electric field that is created by the potential difference between the electrodes. Once the electron gains sufficient energy there is some probability for it to ionize a gas atom or molecule and release a second free electron. Each electron is then accelerated and the process repeats, leading to an electron avalanche that makes the gas highly conducting. The energy gain and multiplication processes must overcome various energy and particle loss processes, and first free electron should be created in preferred locations (e.g., at or near the negative electrode) for maximum effectiveness.

The time required for the second (avalanching) process is the 'formative time lag'. It is generally short and can be practically ignored. Thus, the time required for the first process (the initial electron) is the 'statistical time lag', and it is this 'first electron problem' that is of primary interest in practice. In some devices such as laboratory apparatus or large electric discharge lamps the 'first electron problem' is solved by doing nothing more than waiting for a cosmic ray to create a free electron when it collides with a gas atom, gas molecule, or surface within the device. Electron-ion pairs are always being created at a given rate in atmospheric air by energetic cosmic rays that can easily penetrate into gas volumes within devices and structures. A Geiger counter is an example of a device that detects such events.

However, the ubiquitous cosmic-ray process cannot be relied upon to create effective free electrons within a required timeframe that may be needed for reliable operation of many devices that incorporate a spark gap. In particular, for device employing a spark gap the timeframe is typically too short to rely on a cosmic ray based process because the interaction volume (the region between the electrodes) is relatively small.

Instead, the conventional approach to solving the first-electron problem in a spark gap context (as well as in other devices dealing with similar issues, such as small electric discharge lamps) is to add a source of radioactivity, for example in the form of radioactive krypton-85, which undergoes beta decay to emit an energetic (687 keV) electron, to generate seed electrons and reduce statistical time-lag to acceptable values. Other radioactive materials such as tritium or thorium are sometimes used. The addition of a radioactive component is sometimes referred to as 'radioactive prompting'.

However, radioactive materials, even at trace level, are generally not desirable in a component or product because these materials add to of the cost of manufacturing, handling, and shipping.

BRIEF DESCRIPTION

In one embodiment, a spark gap device is provided. In accordance with this embodiment, the spark gap includes a first electrode having a first surface and a second electrode having a second surface offset from and facing the first surface. The spark gap further includes a light source configured to emit light toward at least the first surface such that photons emitted by the light source when the spark gap is operated are incident on the first surface and cause electron emission from the first surface.

In a further embodiment, an ignition device is provided. In accordance with this embodiment, the ignition device includes one or more igniters configured to ignite a fuel stream or vapor during operation and one or more exciter components, each connected to a respective igniter. Each exciter component includes a spark gap that does not include a radioactive component.

In an additional embodiment, a method for generating a conductive plasma is provided. In accordance with this method, a voltage is applied across a spark gap comprising a first electrode and a second electrode. Free electrons are generated at a surface of at least one of the first electrode or second electrode via a photo-electric effect. Subsequent to generating the free electrons, the conductive plasma is generated across the spark gap.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The present approach relates to spark gaps, such as those used in ignition systems for combustion engines, as well as in other contexts such as surge protection, power switching, and so forth.

Figure 1:
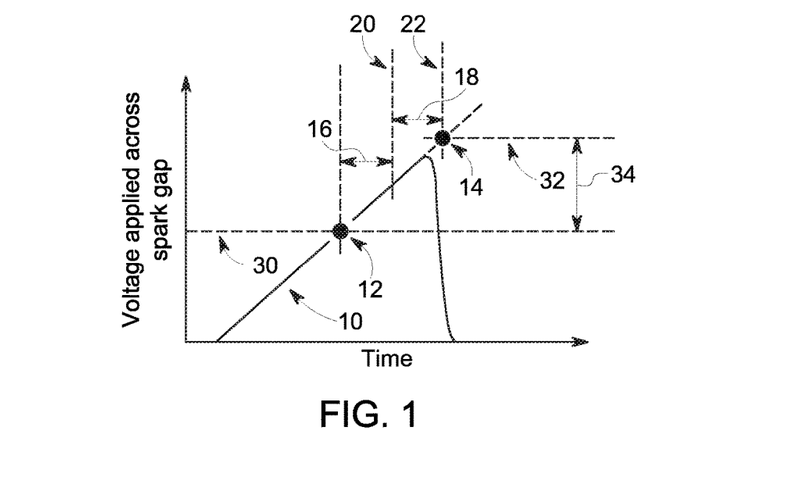
FIG. 1 depicts voltage with respect to time in spark gap operation so as to illustrate concepts related to the present approach.

By way of introduction to the concepts and terminology used herein, An illustrative example of the operation of a spark gap is illustrated in FIG. 1. In this example, if the voltage waveform 10 is a ramp, the rate of voltage rise is 6 kV/s, and the desired voltage rating is 3±0.05 kV, then the total time from Point 12 (the time sufficient voltage for the spark gap to fire is reached) to Point 14 (the time when the spark gap is closed) should be no more than 17 ms. This time corresponds to the 'breakdown' processes that initiate the transition of the gas from an insulator to a conductor.

As can be appreciated from FIG. 1, the breakdown voltage 22 depends on the intrinsic properties of the spark-gap, as well as the voltage ramp 10 that is defined by other portions of the circuit. If the rate of voltage rise is slower, then the time between Point 12 and Point 14 is reduced, so Point 12 is sometimes referred to as the 'intrinsic' breakdown voltage, because it does not depend on the circuit properties.

As noted above, an idealized but useful view of electrical breakdown is to view it as a two-step process, with a first component corresponding to a 'statistical' time 16 for the first electron to appear (at time 20), followed by a second component corresponding to a 'formative' time 18 for the electrons to 'avalanche' to a highly conductive state, occurring at time 22 when the spark gap closes. In this example, the difference between the voltage 30 sufficient for the spark gap to fire and the voltage 32 at which the spark gap closes is the variation 34 in gap voltage.

In terms of the underlying concept, a free electron appears at some time and location in the gas surrounding the spark gap, and is accelerated by the electric field that is created by the potential difference between the electrodes. Once it gains sufficient energy there is some probability for it to ionize a gas atom or molecule and release a second free electron. Each electron is then accelerated and the process repeats, leading to an electron avalanche that makes the gas highly conducting. The energy gain and multiplication processes must overcome various energy and particle loss processes, and first electrons are preferably created in certain locations (e.g., near the negative electrode or cathode) for maximum effectiveness.

As noted above, the time 16 required for the first process (i.e., the release of the initial electron) is referred to as the 'statistical time lag', and it is this 'first electron problem' that is addressed in the present approach. The present approach solves the first-electron problem in the spark gap (i.e., the statistical time lag) without relying on the traditional approach of providing a source of ionizing radiation (e.g., $^{85}$Kr), which is generally undesirable, and thus does not employ 'radioactive prompting'. Similarly, the present approach does not rely solely on the effects of cosmic-rays, for generation of the initial electrons as such rays typically are insufficient to generate first electrons at a sufficient rate needed in a spark gap ignition context (or other industrial or mechanical context).

With the preceding introduction in mind, in the present approach $^{85}$Kr is eliminated from the spark gap and the photo-electric effect is instead employed to generate seed electrons. By way of example, in one implementation, a light source is employed that emits at a specific nominal wavelength (or range of wavelengths) at a specific level of emitted flux.

In the photoelectric process the absorption of a photon by a material causes the material to emit an electron. The energy of the photon must exceed the work-function of the material. The work-function of materials is typically in the range 2-6 electron-volts. The energy $\varepsilon$ of a photon is related to its wavelength $\lambda$ through the expression $\varepsilon=hc/\lambda$, where h is Planck's constant, c is the speed of light. In practical units $\varepsilon=1240/\lambda$, where s is in units of electron-volts and is $\lambda$ in units of nanometers. To be effective for photoelectron emission the wavelength of light should, therefore, be shorter than a certain value in the range 200-600 nanometers, corresponding to 2-6 electron-volts, with the exact value depending on the specific material.

Further, if the light source is to be located outside the light-transmissive (e.g., glass) envelope of a spark-gap, then the spectral transmission of the envelope should be considered. By way of example, borosilicate glass absorbs strongly at wavelengths less than 300 nanometers, corresponding to an energy of 4 electron-volts. So if, by way of example, a given material has a work-function of 3 electron-volts, and a light source is placed outside the glass envelope to create photoelectrons, then only photons of energy 3-4 electron volts (300-400 nanometers) will be effective. Photons with wavelength longer than 400 nanometers will not have sufficient energy to cause photoemission, and photons with wavelength shorter than 300 nanometers will be absorbed by the glass. Thus, the material to be photo-electrically stimulated, the wavelength of light to be employed, and the transmissive properties of the envelope are all factors to be considered in the design and configuration or a spark gap system as discussed herein.

With the preceding in mind, the light source is directed at one of the electrodes (e.g., the cathode) of a spark gap and the emitted photons incident on the surface of the electrode cause it to emit electrons via the photo-electric effect. These electrons are then available to initiate the gas discharge or breakdown event. In accordance with certain implementations, the electrode on which photons from the light source are incident and which emits electrons is a conventional electrode (e.g., a conventional conductive metal substrate and surface), as opposed to an electrode having coated surface or other emissive coating (e.g., a special purpose emissive coating) and in contrast to a photoelectrode (e.g., a photocathode or other an annular electrode or coil having a coating or composition specifically for the purpose of emitting electrons in response to light photons).

Figure 2:
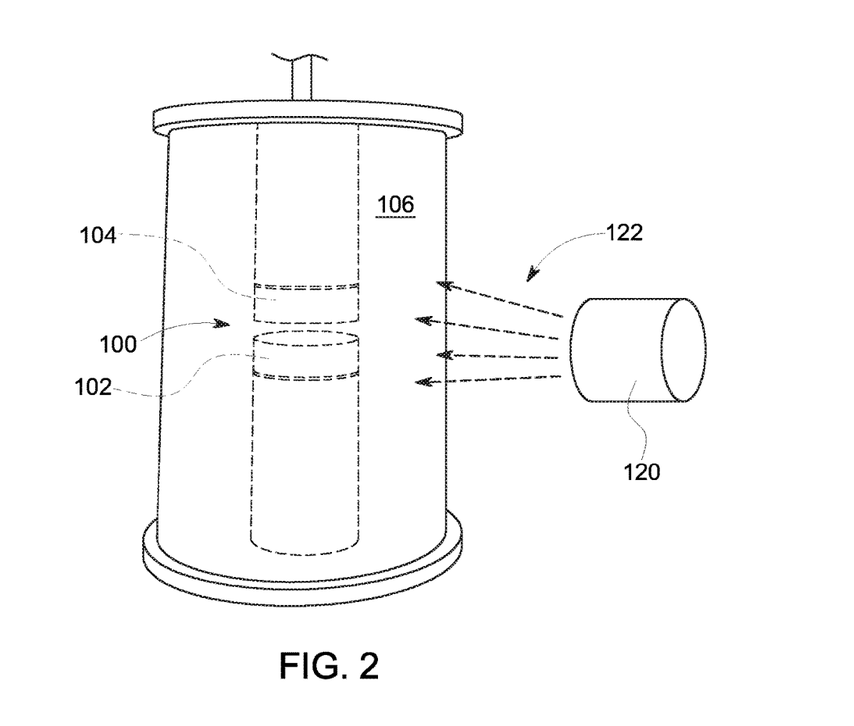
FIG. 2 depicts a spark gap and light source, in accordance with aspects of the present disclosure.

In one implementation, a tunable light source may be used, which may be adjusted so as to find a suitable (or optimal) range of wavelengths and/or light flux for a given spark gap configuration or application. In one embodiment, the light source may be a light-emitting diode (LEDs) operated at a minimum threshold current. With the preceding in mind, and turning to FIG. 2, depicts an example of a spark gap 100 suitable for use in an ignition systems (such as for use in combustion engines), surge protection contexts, or power switching. The spark gap 100 as discussed herein refers to an assembly of a separated pair of electrodes (i.e., anode 102, and cathode 104) within a sealed environment (e.g., a glass envelope) containing a gas mixture 106).

Figure 3:
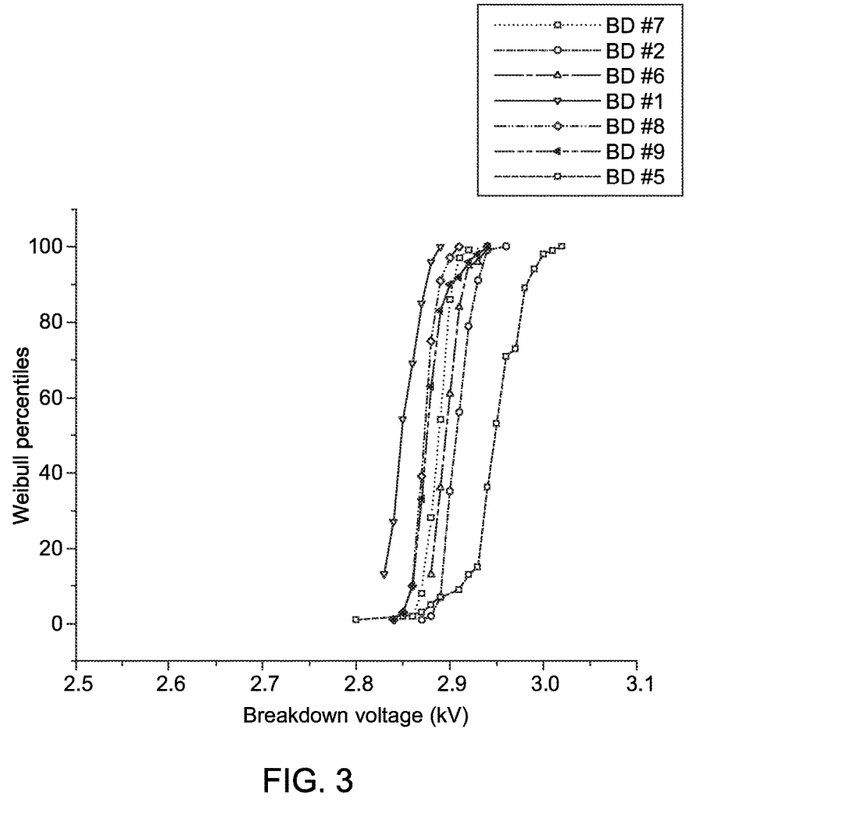
FIG. 3 depicts a baseline breakdown voltage distribution in the presence of krypton-85.

As noted above, in conventional implementations, the gas mixture 106 may include $^{85}$Kr, a radioactive isotope. As noted above, the function of the radioactive $^{85}$Kr is to generate a certain amount of seed electrons in order to reduce the variation in breakdown voltage. FIG. 3 shows the statistics, using Weibull distributions, for spark gaps made with $^{85}$Kr included in the gas mixture 106, i.e., the conventional baseline design.

In the experimental results depicted graphically in FIG. 3, the voltage is ramped linearly from zero at a rate of 6 kV/s, and the spark gaps were built to break down at a nominal value of 3 kV. The data was taken on 7 different samples of spark gaps, each fired 100 times, measuring the breakdown voltage. The Weibull parameters shown by these curves are characteristic of breakdown voltage and demonstrate the variation in breakdown voltage from sample to sample, and modulus, which measures the variation from spark to spark for the same gap. These Weibull parameters, as used herein, are used as a measure of consistency in breakdown voltage, which is a useful design parameter for spark gaps. For instance, for spark gaps used in engine ignition systems, if the variation in breakdown voltage is too large (outside the design window of the exciter electronics), the ignition system can misfire or be damaged.

Figure 4:
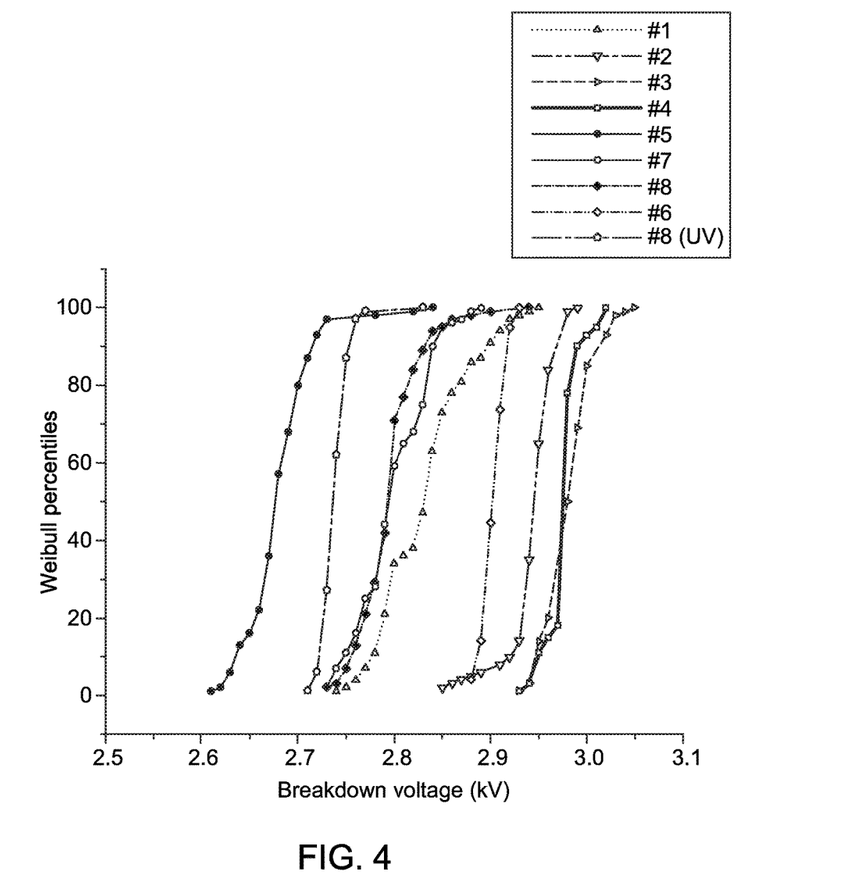
FIG. 4 depicts a breakdown voltage distribution in the absence of krypton-85.

If one removes $^{85}$Kr from the gas mixture 106 surrounding the spark gap, the variation in breakdown voltage becomes too large for many common applications (e.g., ignition systems). This is illustrated in FIG. 4, where spark gaps were operated under similar conditions to the preceding experiment, but without $^{85}$Kr being included in the gas mixture 106. Compared to the baseline demonstrated in FIG. 3, the difference in the spread (i.e., variation) in the breakdown voltage is observable. In particular, the difference in slope of each curve is lower in FIG. 4 (without $^{85}$Kr) than in FIG. 3 (with $^{85}$Kr). This demonstrates the beneficial effect of $^{85}$Kr on spark-gap performance. It may be noted that, in FIG. 4 (in the absence of $^{85}$Kr) the lateral left-to-right spread of data arises because the gas pressure in the spark gaps shown in FIG. 4 was not adjusted during manufacturing so as to bring the breakdown voltage closer to the specification. As such the relevant comparison of FIGS. 3 and 4 to observe the described effect is the comparison of the slopes. With the preceding in mind, simply omitting $^{85}$Kr from the spark gap gas mixture 106 without providing an alternative seed electron generation mechanism is not an option for most applications.

With this in mind, the present approach omits $^{85}$Kr from the surrounding gas mixture 106 and employs a light source 120 to generate seed electrons. In particular, the present approach relies on the photo-electric effect to generate seed electrons. Based on this effect, when photons 122 with sufficient energy from the light source 120 impinge on the surface of one of the electrodes (e.g., cathode 104), electrons are generated that act as the seed electrons. If the flux and energy of the photons 122 are above a minimum threshold, then enough seed electrons are generated in the gaps to cause a consistent breakdown voltage, thereby providing a tight breakdown voltage distribution (i.e., with a band that is approximately 0.05 kV wide) comparable to what is obtained with $^{85}$Kr in the gas mixture 106 even though the $^{85}$Kr is not present.

It may be noted that the present approach is not directed to the reduction of the breakdown voltage, which may be an issue in other contexts. Instead, the present approach is directed to providing a tight distribution of breakdown voltage, particularly in the absence of $^{85}$Kr, not to reduce the breakdown voltage. With this in mind, the present approach relates to the use of a suitable ranges of energy and flux of the photons (as discussed in greater detail below) for application to spark gaps 100

In one implementation, a tunable light source 120 may be employed. In such an example, the tunable light source 120 may be used to assess the effect of wavelength (photon energy) and photon flux on the breakdown voltage of different gaps, and to thereby identify suitable ranges of photon energy and/or flux for different gap types and/or distances.

Figure 5:
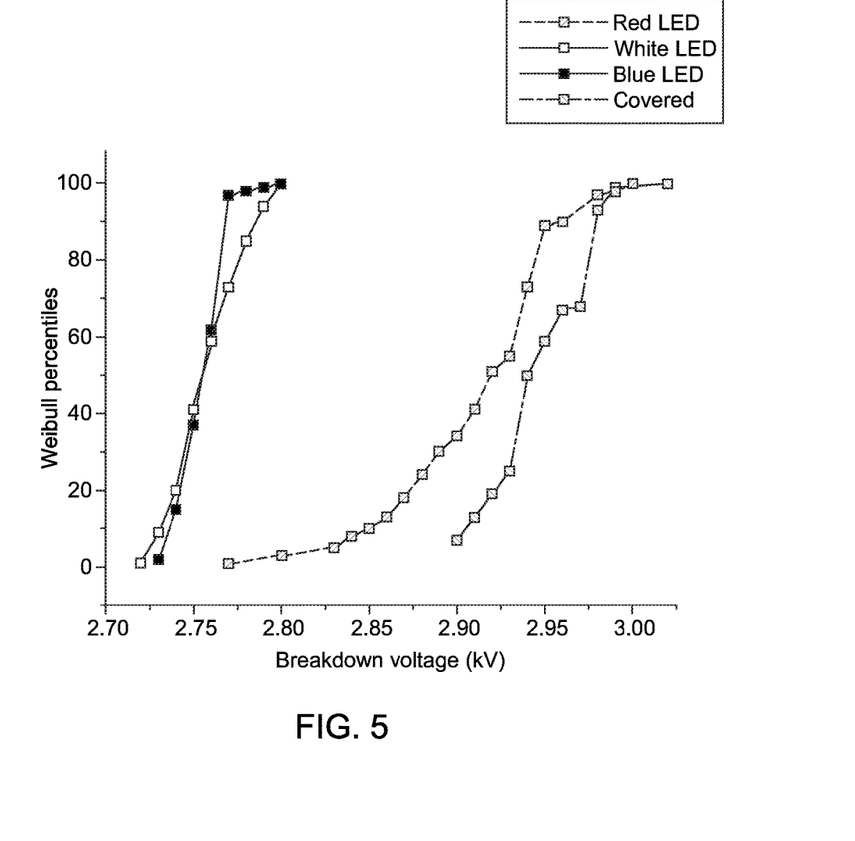
FIG. 5 depicts breakdown voltage distribution for spark gap samples in the absence of krypton-85 but in the presence of light stimulation at different wavelengths, in accordance with aspects of the present disclosure.

In one embodiment, the light source 120 may be a light emitting diode (LED) light source, though other types of light sources may also be employed with comparable results. With this in mind, FIG. 5 graphically illustrates the results in terms of breakdown voltage for LED light sources having different emission spectra (e.g., red, white, and blue frequencies) corresponding to different photon energies. In this example, the red LED light source was not effective, for reasons that can be understood from the nature of the photoelectric effect. The human eye perceives red when photons have wavelengths greater than 600 nanometers, corresponding to energies below 2 electron-volts, and their energy is too low to cause photoemission from typical materials, where the work-function is more typically 3-5 electron volts. Conversely, the white and blue LEDs performed well, with results comparable to those observed when $^{85}$Kr is present in the gas mixture 106. The human eye perceives blue when the photon wavelength is around 450 nanometers, corresponding to 2.75 electron volts, so blue photons are more likely to have sufficient energy for photoemission than red photons. White light is a mixture of colors, that includes blue, and so white light contains blue electrons that are effective for photoemission.

Figure 6:
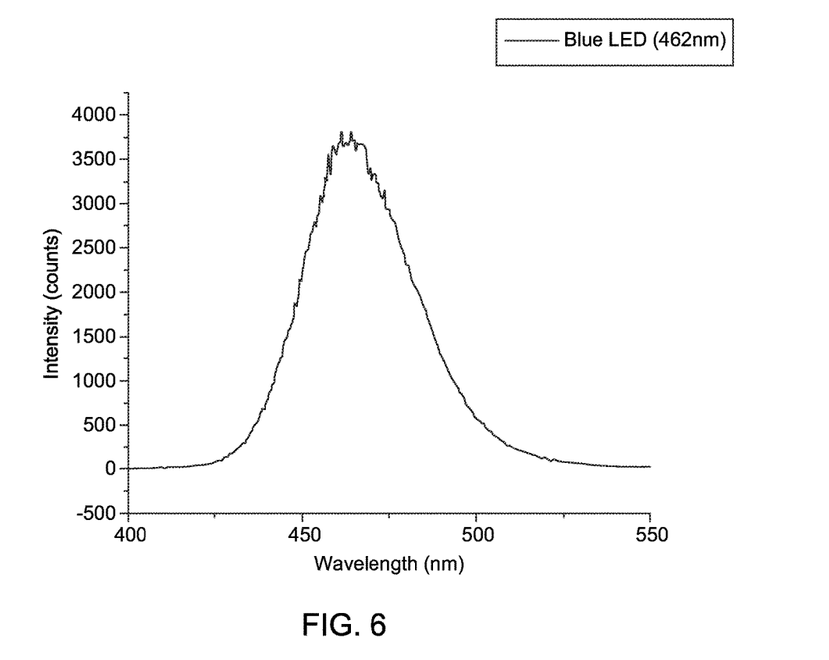
FIG. 6 depicts a spectral distribution for a 462 nm blue light-emitting diode.
Figure 7:
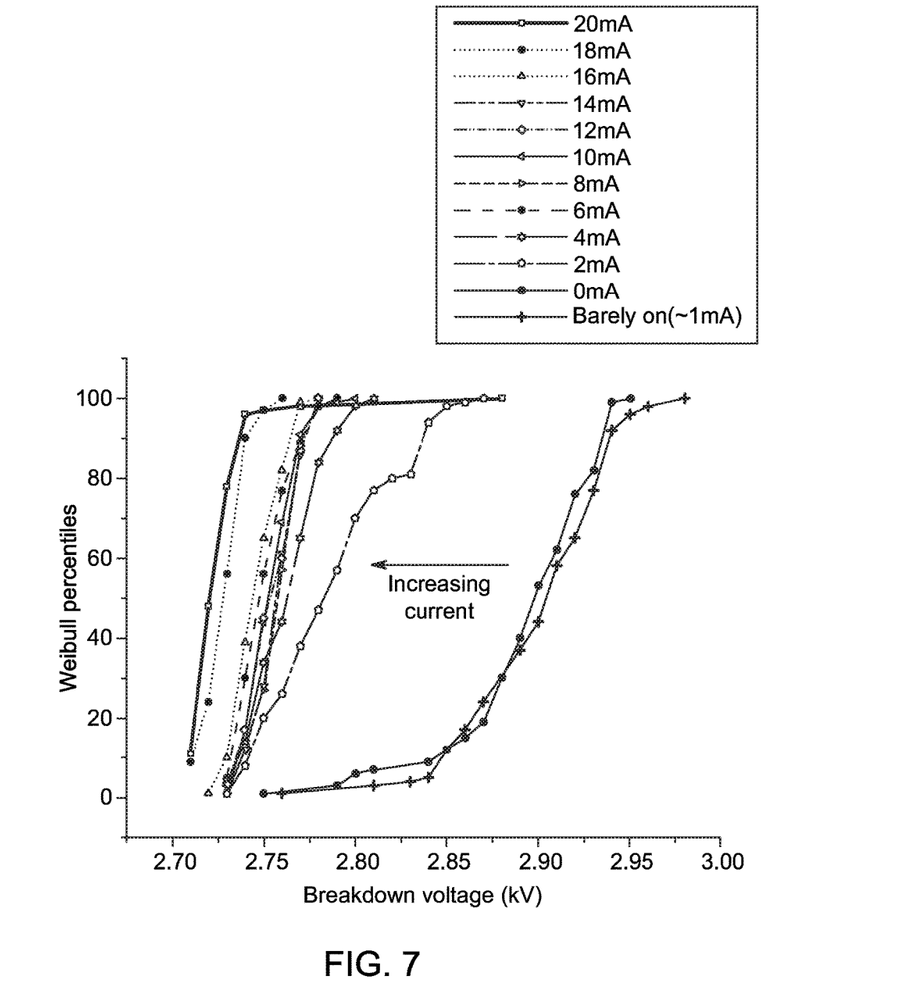
FIG. 7 depicts breakdown voltage distribution for spark gap samples in the absence of krypton-85, but in the presence of a 462 nm blue light emitting diode operated at various current levels (i.e., light flux levels), in accordance with aspects of the present disclosure.
Figure 8:
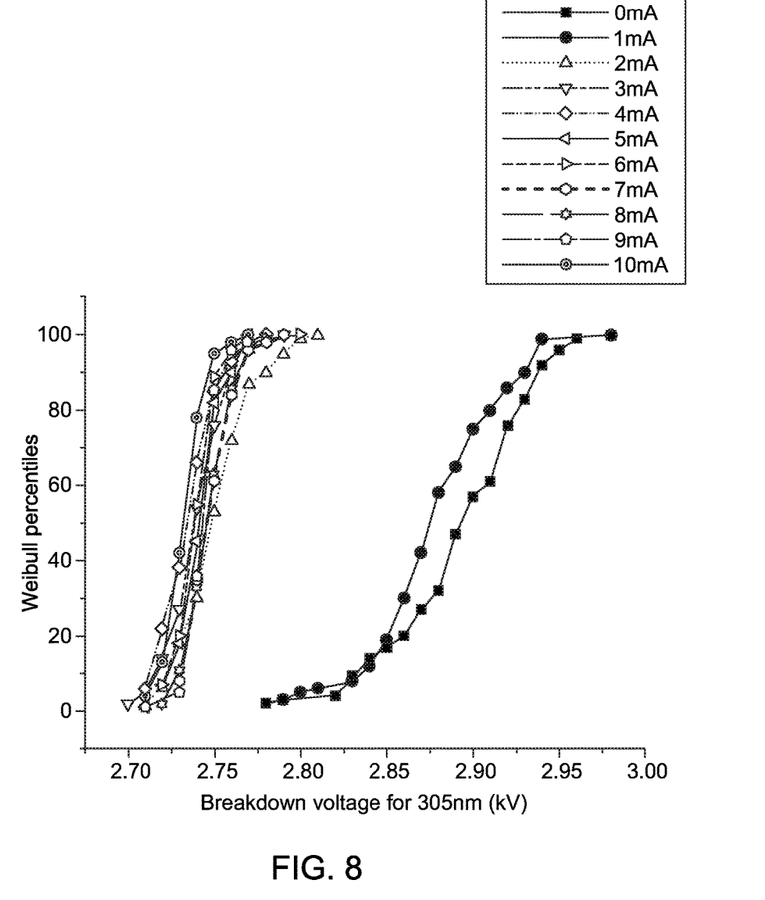
FIG. 8 depicts breakdown voltage distribution for spark gap samples in the absence of krypton-85, but in the presence of a 305 nm UV light emitting diode operated at various current levels (light flux levels), in accordance with aspects of the present disclosure.
Figure 9:
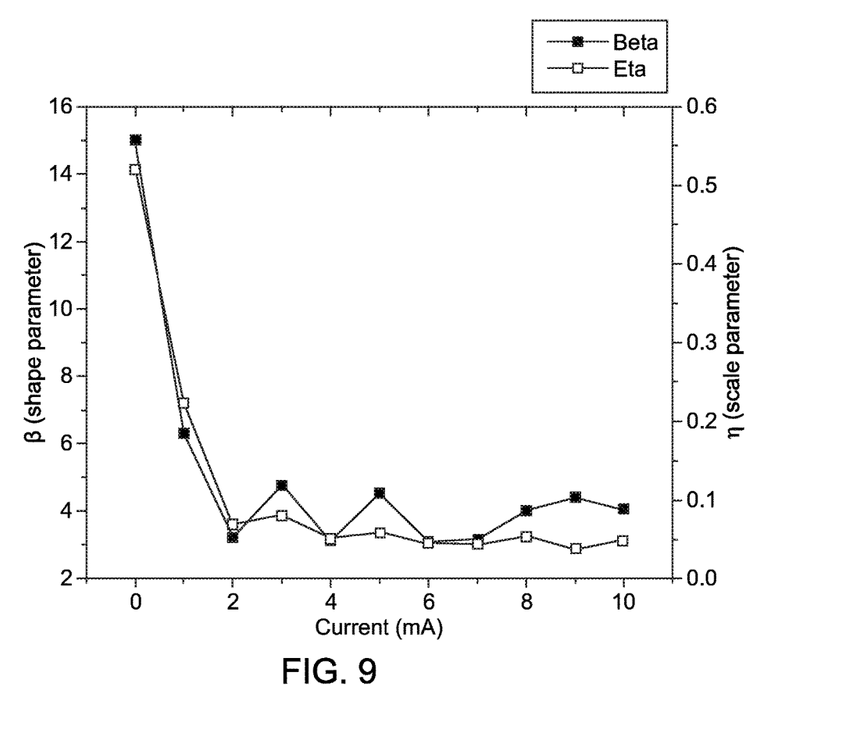
FIG. 9 depicts Weibull parameters for the data set shown in FIG. 7, in accordance with aspects of the present disclosure.

With these results in mind, a blue LED light source 120 was tested to investigate the effect of its photon flux, implemented by varying the operating current of the LED, on spark gap behavior in the absence of $^{85}$Kr. In this experiment, the LED had an emission spectrum as shown in FIG. 6, with a nominal wavelength of 462 nm (e.g., approximately 465 nm or less). As shown in FIG. 7, when the operating current exceeded a minimum threshold (e.g., between 1 mA and 2 mA), the spark behavior at gap 100 was comparable to when $^{85}$Kr was present. Similar results were obtained with an LED operating at 305 nm (i.e., an ultraviolet (UV) LED), as shown in FIG. 8 (depicting breakdown voltage distribution at 305 nm) and FIG. 9 (depicting Weibull parameters for the data set shown in FIG. 8).

Figure 10:
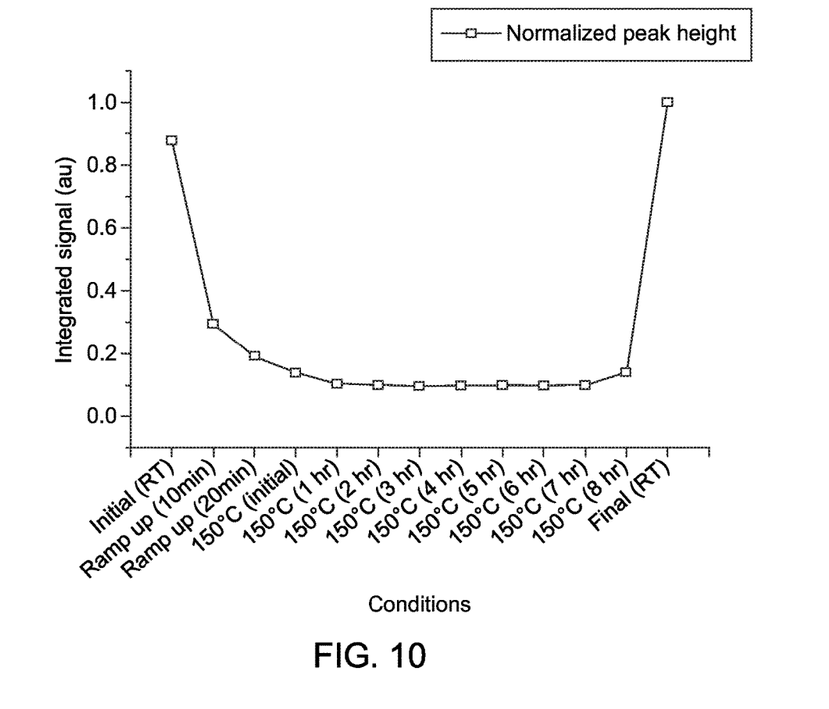
FIG. 10 depicts the effect of temperature on light emitting diode (LED) light output performance, in accordance with aspects of the present disclosure.

As may be appreciated, the temperature environment where the present approach may be employed may vary. By way of example, in an ignition system for a jet engine the environmental temperature at the exciter component where the spark gap 100 is located is around 150° C. The operation of the spark-gap does not depend strongly on temperature, but the efficiency of light generation by light-emitting diodes generally decreases strongly above some characteristic temperature. With this in mind, the effect of temperature on seed electron generation was also tested. In one such experiment, the effect of temperature was tested using the 305 nm UV LED, with the results being shown in FIG. 10. As shown in these results, the light flux is reduced at 150° C., compared to results at room temperature, by about 90%.

Figure 11:
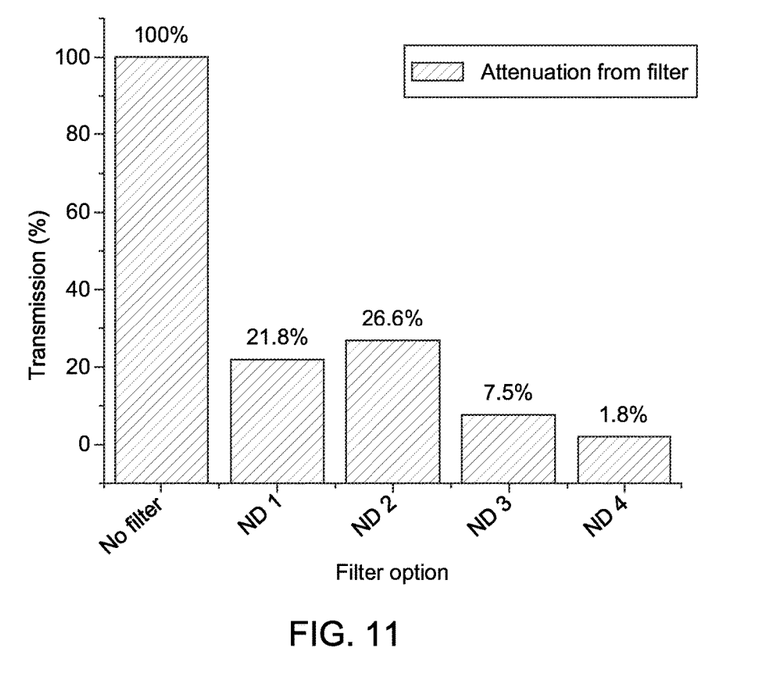
FIG. 11 depicts simulated light emitting diode light flux reduction through various neutral-density filters, in accordance with aspects of the present disclosure.
Figure 12:
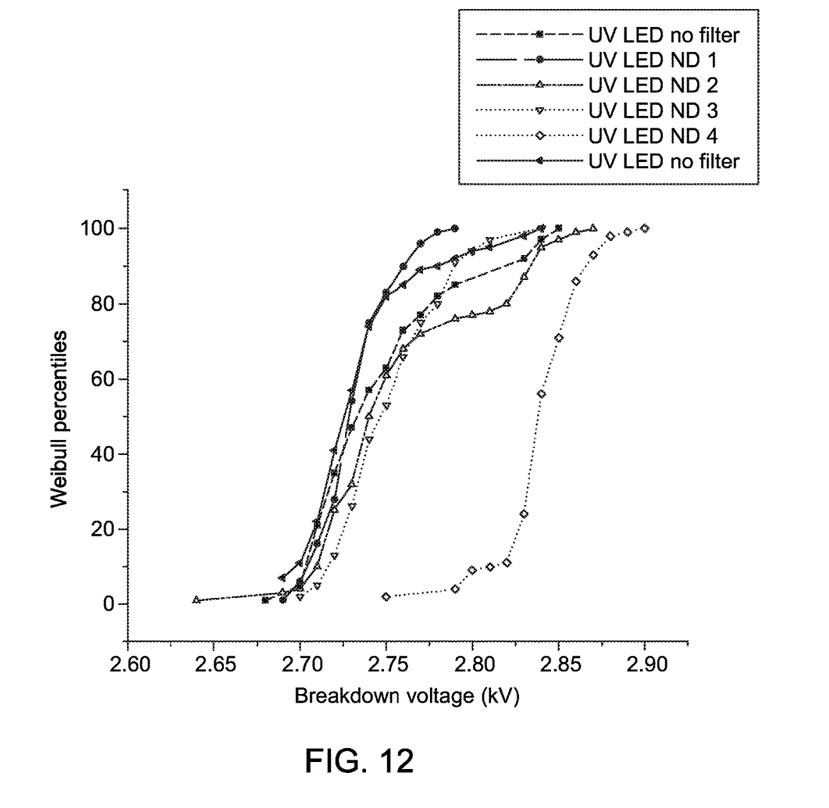
FIG. 12 depicts the effect of light flux (filter level) on spark gap performance (breakdown voltage distribution), in accordance with aspects of the present disclosure.

With this in mind, a study was performed to determine if operating an LED at these low output levels is still sufficient for achieving the intended spark gap operation. In this study, LED output using suitable optical filters was attenuated using neutral density filters to allow the LED to deliver the minimum flux of photons required to generate a suitable amount of seed electrons to provide a breakdown voltage distribution comparable to if $^{85}$Kr were present. The results of such an approach are demonstrated graphically in FIGS. 11 and 12, which show simulated effect of temperature on LED light flux reduction and its impact on spark gap performance. In particular, FIG. 11 depicts simulated LED light flux reduction through various neutral density (ND) filters and FIG. 12 depicts the effect of light flux (filter level) on spark gap performance (breakdown voltage distribution). The results show that with levels greater than 7.5% (ND 3) of maximum output flux, the intended spark gap performance is achieved.

Figure 13:
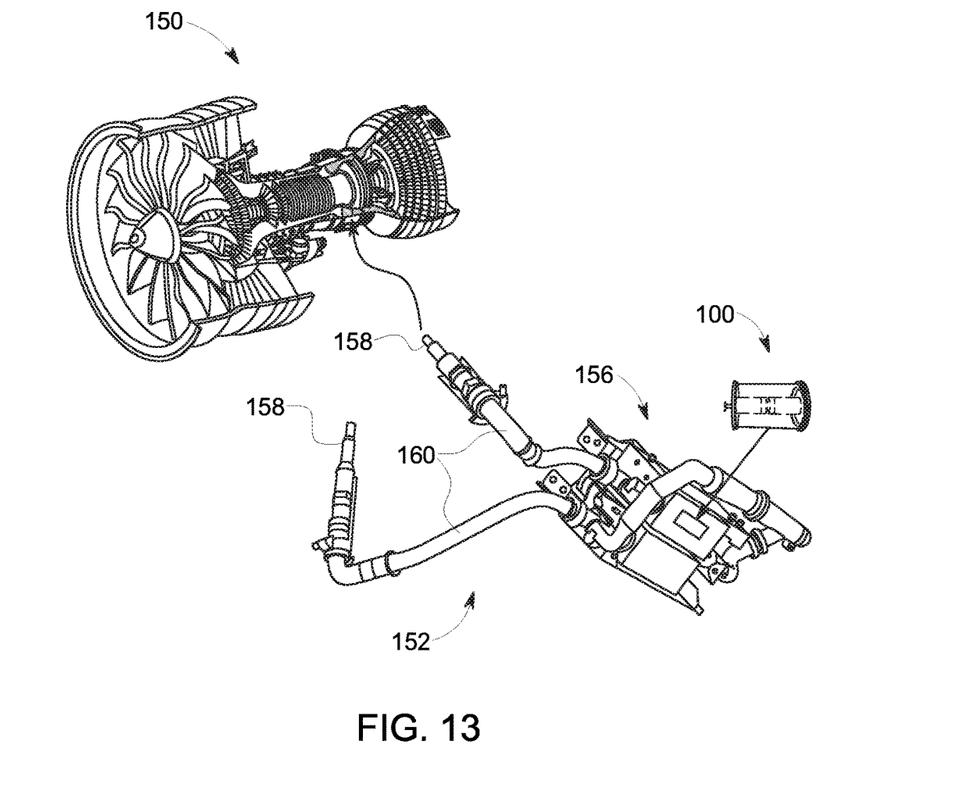
FIG. 13 depicts an engine, here a jet engine, employing ignition components that include a spark gap as discussed herein and in accordance with aspects of the present disclosure.

With the preceding in mind, FIG. 13 depicts an example of an engine 150, here a jet engine, in which the spark gap 100 using a light source for free electron generation may be employed as part of the fuel ignition system 152 for the engine 150 by which a fuel stream or vapor is combusted. In this example, a spark gap 100 may be provided for one or more igniters 158. For example, each spark gap 100 may be provided as part of an exciter component 156 in communication with a respective igniter 158 via a corresponding lead 160. In this manner, spark events induced at a given spark gap 100 may correspond to a conductive flow between the electrodes of the spark gap 100, causing an ignition event at the corresponding igniter 158 and an ignition event during operation of the engine 150. Though an engine 150 such as that depicted in FIG. 13 is one possible use for a spark gap 100 as discussed herein (e.g., as part of an ignition system), a spark gap 100 as presently disclosed may also be used in other ignition and non-ignition contexts.

Technical effects of the invention include an alternative approach to generating seed electrons at a spark gap, allowing $^{85}$Kr to be eliminated from the gas mixture typically present at the spark gap while maintaining the same performance and function of the device. The present approach utilizes the photo-electric effect, using a light source with a specific nominal wave length (or range of wavelengths) at a specific level of emitted flux to generate seed electrons. The light source (e.g., an LED operating at a minimum threshold current) is directed at one of the electrodes (e.g., the cathode) of a spark gap and the emitted photons landing incident on the surface of the electrode causes it to emit electrons needed to initiate the gas discharge or breakdown event. The present approach may be retrofit in existing packaging, such that there would be no major changes in the manufacturing of the spark gap 100 or the remainder of the ignition system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
  a spark gap, comprising:
    a first electrode having a first surface;
    a second electrode having a second surface offset from and facing the first surface; and
    a light source configured to emit light toward at least the first surface such that photons emitted by the light source when the spark gap is operated are incident on the first surface and cause electron emission from the first surface; and
  a second source to apply a voltage across the first and the second electrode, wherein the voltage is ramped from a value that is below an intrinsic breakdown voltage of the spark gap to the intrinsic breakdown voltage of the spark gap and then to a second voltage at which the spark gap closes, wherein the second voltage is higher than the intrinsic breakdown voltage.

2. The spark gap of claim 1, wherein the light source is a tunable light source.

3. The spark gap of claim 1, wherein the light source is a light emitting diode.

4. The spark gap of claim 1, wherein the intrinsic breakdown voltage of the spark gap is not substantially altered by the operation of the light source.

5. The spark gap of claim 1, wherein the light source emits at a nominal wavelength of approximately 465 nm or less.

6. The spark gap of claim 1, wherein the light source is operated at a threshold current that causes generation of a quantity of seed electrons at a gap between the first electrode and second electrode that results in a consistent breakdown voltage.

7. The spark gap of claim 1, wherein the first electrode comprises a cathode and the second electrode comprises an anode.

8. The spark gap of claim 1, wherein the spark gap does not include a radioactive component.

9. The spark gap of claim 1, wherein the light source is operated at a threshold current that causes generation of a quantity of seed electrons at a gap between the first electrode and second electrode that results in a breakdown voltage distribution within a specified tolerance.

10. An ignition device, comprising:
one or more igniters configured to ignite a fuel stream or vapor during operation; and
one or more exciter components, each connected to a respective igniter, wherein each exciter component comprises a spark gap that does not include a radioactive component,
wherein the spark gap comprises:
a first electrode having a first surface; and
a second electrode having a second surface offset from and facing the first surface; and
a light source configured to emit light toward at least the first surface such that photons emitted by the light source when the spark gap is operated are incident on the first surface and cause electron emission from the first surface; and
wherein the ignition device further comprises a second source to apply a voltage across the first and the second electrode, wherein the voltage is ramped from a value that is below an intrinsic breakdown voltage of the spark gap to the intrinsic breakdown voltage of the spark gap and then to a second voltage at which the spark gap closes.

11. The ignition device of claim 10, wherein the spark gap is configured to generate free electrons via a photo-electric effect.

12. The ignition device of claim 10, wherein the light source is a tunable light source.

13. The ignition device of claim 10, wherein the first electrode is a cathode and the second electrode is an anode.

14. The ignition device of claim 10, wherein the light source is a light emitting diode configured to emit at a nominal wavelength of 465 nm or less.

15. The ignition device of claim 10, wherein the intrinsic breakdown voltage of the spark gap is not substantially altered by the operation of the light source.

16. A method for generating a conductive plasma, comprising:
applying a voltage across a spark gap comprising a first electrode and a second electrode;
emitting tight from a light source configured to emit light toward at least one of the first electrode or the second electrode such that photons emitted by the light source are incident on at least one of the first electrode or the second electrode, thereby generating free electrons at a surface of at least one of the first electrode or second electrode via a photo-electric effect when the spark gap is operated; and
subsequent to generating the free electrons, generating the conductive plasma across the spark gap;
wherein the voltage is ramped from a value that is below an intrinsic breakdown voltage of the spark gap to the intrinsic breakdown voltage of the spark gap and then to a second voltage at which the spark gap closes.

17. The method of claim 16, further comprising igniting a fuel stream or vapor at a downstream igniter component in response to the conductive plasma bridging the spark gap.

18. The method of claim 16, wherein free electrons are not generated by a radioactive isotope.

* * * * *